US008529230B1

(12) United States Patent
Colley, III et al.

(10) Patent No.: US 8,529,230 B1
(45) Date of Patent: Sep. 10, 2013

(54) RETAINING MECHANISMS FOR THREADED BODIES IN RECIPROCATING PUMPS

(75) Inventors: E. Lee Colley, III, Houston, TX (US);
Joel Donohue, Tomball, TX (US);
Larry M. Hill, Katy, TX (US)

(73) Assignee: Black Horse, LLC, Houston, TX (US)

( * ) Notice: Subject to any disclaimer, the term of this patent is extended or adjusted under 35 U.S.C. 154(b) by 254 days.

(21) Appl. No.: 12/925,608

(22) Filed: Oct. 26, 2010

(51) Int. Cl.
*F04B 53/00* (2006.01)
*F16J 15/12* (2006.01)
*F16B 39/10* (2006.01)

(52) U.S. Cl.
USPC .................. 417/572; 92/165 PR; 411/121

(58) Field of Classification Search
USPC ......... 417/572; 92/165 R, 165 PR; 411/119, 411/121
See application file for complete search history.

(56) References Cited

U.S. PATENT DOCUMENTS

| 1,544,627 | A | * | 7/1925 | Bateman ......................... 411/87 |
| 5,597,278 | A | * | 1/1997 | Peterkort ...................... 411/134 |
| 7,891,923 | B2 | * | 2/2011 | Marczynski .................. 411/102 |
| 2008/0115630 | A1 | * | 5/2008 | Vinciguerra et al. ........ 81/57.44 |
| 2010/0143163 | A1 | * | 6/2010 | Patel et al. .................... 417/313 |
| 2011/0296982 | A1 | * | 12/2011 | Dille et al. ................ 92/165 PR |

OTHER PUBLICATIONS

*TWS 2250HD Well Service Pump*, Weir SPM, Copyright 2009 Weir SPM.

* cited by examiner

*Primary Examiner* — Charles Freay
(74) *Attorney, Agent, or Firm* — Keith B. Willhelm

(57) ABSTRACT

Novel retainers for a body threaded into a reciprocating pump used for pumping fluid into a well are provided for. They comprise one or more elastic members adapted to flex and allow the retainer to be interlocked with the pump and a member adapted to engage the threaded body and to limit loosening thereof. Preferably, the engagement member is biased into engagement with the threaded body, for example, by elastic, magnetic, or gravitational potential energy. The novel retainers include stops which limit loosening or tightening of the threaded body and pawls that limit loosening of the threaded body.

48 Claims, 9 Drawing Sheets

RETAINING MECHANISMS FOR THREADED BODIES IN RECIPROCATING PUMPS

FIELD OF THE INVENTION

The present invention relates in general to reciprocating pumps and, in particular, to retaining mechanisms for limiting loosening of packing nuts and other threaded bodies on reciprocating pumps, and especially, on high pressure, high volume pumps used in the oil and gas industry.

BACKGROUND OF THE INVENTION

Hydrocarbons, such as oil and gas, may be recovered from various types of subsurface geological formations. A well is drilled through the earth until the hydrocarbon bearing formation is reached. Hydrocarbons, at least ideally, then are able to flow from the porous formation into the well.

That is true for some subsurface formations, such as sandstone, which are very porous. Hydrocarbons are able to flow easily from the formation into a well. Other formations, however, such as shale rock, limestone, and coal beds, are only minimally porous. The formation may contain large quantities of hydrocarbons, but production through a conventional well may not be commercially practical because hydrocarbons flow though the formation and collect in the well at very low rates. The industry, therefore, relies on various techniques for improving the well and increasing production from formations which are relatively nonporous.

One technique involves drilling a well in a horizontal direction, so that the borehole extends along a formation instead of passing through it. More of the formation is exposed to the borehole, and the average distance hydrocarbons must flow to reach the well is decreased. Another technique involves creating fractures in a formation which will allow hydrocarbons to flow more easily. Indeed, the combination of horizontal drilling and fracturing, or "frac'ing" or "fracking" as it is known in the industry, is presently the only commercially viable way of producing natural gas from the vast majority of North American gas reserves.

Fracturing is most commonly accomplished by using "frac" pumps to inject a fracturing fluid into a well at extremely high rates. Fluid is pumped into the well until it creates pressure high enough to fracture the formation. The fluid typically includes a proppant, such as grains of sand, ceramic or other particulates, that prevents the fractures from closing when pumping is stopped, thus creating flow paths for hydrocarbons-through the formation.

A frac pump may operate at fluid pressures up to 18,000 psi or more and at flow rates of 2 to 3 thousand gpm. Moreover, the proppant which typically is carried by the injection fluid is extremely abrasive. Given those operating conditions frac pumps necessarily incorporate a number of wear elements or consumables such as plungers, valves, and packings, which must be replaced periodically.

The harsh operating conditions and frequent servicing means that the typical fracturing operation rarely relies on a single pump. It is important that the operation continue uninterrupted once it has been initiated. If there is a significant pressure drop before the required volume of proppant has been injected into a formation, the formation will tend to relax and close the fractures. Operators, therefore, typically use an array of frac pumps connected in parallel to a common flow line. The array provides excess capacity so that, if necessary, individual pumps may be taken off-line for repair or service without having to stop the overall operation. That excess capacity, however, has its own cost, which can be reduced only to the extent that the likelihood of any individual pump failing or requiring service during the frac operation is reduced.

Reducing the likelihood of pump failure or servicing during frac operations, however, is increasingly difficult. Frac jobs have become more extensive, both in terms of the pressures required to fracture a formation and the time required to complete all stages of an operation. For example, prior to horizontal drilling, a typical vertical well might require fracturing in only one, two or three zones at pressures usually well below 10,000 psi. Pumps were only required to operate for a few hours at a time and could be returned to a repair facility for service between operations.

Fracturing a horizontal well, however, may require fracturing in 20 or more zones. Thus, fracturing horizontal wells in shale formations such as the Eagle Ford shale in South Texas typically requires pressures of at least 9,000 psi and 6 to 8 hours or more of pumping. Horizontal wells in the Haynesville shale in northeast Texas and northwest Louisiana require pressures of around 13,500 psi. Pumps also may be required to operate near continuously for several days before fracturing is complete. That has led operators in the Haynesville shale to provide up to 50% excess pumping capacity.

Unfortunately, when a pump is operated at high power for extended periods of time, threaded nuts and covers designed to provide access to pump consumables may tend to loosen. The problem is exacerbated because many of the nuts and other threaded bodies have relatively large diameters. Some loosening may be tolerated, but excessive loosening has various consequences. At the least, it requires that operators constantly monitor and retighten all of the many threaded nuts and covers on a pump. Otherwise, a threaded nut or cover may loosen to the point where fluid is discharged from the pump. It also is possible for a loosened nut or cover to come into contact with moving parts of the pump and cause significant damage to the pump.

Thus, workers in the art have proposed various mechanisms to lock such threaded closures in place. For example, U.S. Publ. Pat. Appl. No. 2010/0,143,163 of P. Patel et al. discloses a packing nut lock and an access bore cover locking assembly which are designed for use with a typical frac pump. Such pumps are reciprocating plunger pumps having a number of plungers, usually three (a "triplex" pump) or five (a "quintiplex" pump). The plungers move back and forth in a cylinder, traveling in and out of a pump chamber. A fluid tight seal is provided between the cylinder and the plunger by a packing element. The pump chamber has an intake port and a discharge port. Each port has a one-way valve. Thus, fluid enters the chamber through the intake port as the plunger withdraws from the chamber and is pumped out of the chamber through the discharge port as the plunger enter the chamber.

The pump is constructed so that its packing elements, valves, and other wear components may be accessed relatively easily. For example, the plunger packing is mounted in a slightly enlarged, rear portion of the cylinder and is held in place by a threaded, annular nut which screws into the cylinder block. The nut may be removed to provide access to the packing so that it may be replaced as needed. Similarly, bores are provided in the cylinder block which allow access to the intake and discharge port valves so that they may be replaced. Those access bores are sealed with plugs that are held in place by threaded covers.

The packing nut lock disclosed in Patel '163 is configured for use with a typical packing nut. Those conventional nuts have a series of "spanner holes," that is, cylindrical passageways passing radially through their unthreaded end. The passageways are situated so that a rod, a so called "spanner" tool, may be inserted into the passageways as needed to tighten and loosen the nut. The lock itself has a main body with a cylindrical pin. Once the packing nut is tightened, the pin on the lock is placed in one of the spanner holes in the nut. The lock then is secured to the cylinder housing of the pump by a pair of set screws passing through the lock body.

It will be appreciated, however, that several operations are required to install and uninstall the lock. Additionally, a chain or cable preferably also must be used to ensure that the lock is not dropped or misplaced as the packing nut is removed and the packing serviced.

The access bore cover locking assembly disclosed in Patel '163 also is configured for use with a typical access bore cover. The cover is used to secure a plug or, as it is commonly called, a "suction valve cover" within the access bore. The cover is threaded so that it may be screwed into the access bore. The outer surface of the cover has a central polygonal opening, typically a hexagonal opening, into which an Allen wrench may be inserted to tighten and loosen the cover. The locking assembly includes a polygonal locking member which fits intimately into the central polygonal opening of the cover. Locking member has a central aperture, and it is secured to the suction valve cover by a reverse threaded bolt passing through the central aperture. The locking member also has a pair of threaded openings which allow set screw to be driven into engagement with the suction valve cover.

It will be appreciated, however, that the cover locking assembly prevents relative rotation of the suction valve cover, locking member, and bore cover, but does not prevent collective rotation of those components relative to the cylinder housing. As with the packing nut lock, the cover locking mechanism also requires several operations to install and uninstall, thus, complicating service of the pump valves. It also comprises various relatively small components that may easily be misplaced during service operations.

Such disadvantages and others inherent in the prior art are addressed by the subject invention, which now will be described in the following detailed description and the appended drawings.

SUMMARY OF THE INVENTION

The subject invention provides for retainers for a body threaded into a cylinder block of a fluid end of a reciprocating pump used for pumping fluid into a well. The novel retainers comprise one or more elastic members adapted to flex and allow the retainer to be interlocked with the pump and a member adapted to engage the threaded body and to limit loosening thereof. Preferably, the engagement member is biased into engagement with the threaded body, for example, by elastic, magnetic, or gravitational potential energy. The novel retainers include stops which limit loosening or tightening of the threaded body and pawls that limit loosening of the threaded body. Thus, it will be appreciated that the novel retainers may be easily installed on pumps already in service with little or no modification to or disassembly of the pump.

The subject invention also provides for pawls and ratchet mechanisms for retaining a body threaded into a fluid end cylinder block of a reciprocating pump used for pumping fluid into a well. The threaded body comprises a plurality of detents. The pawl comprises a member adapted to engage one or more of the detents in the threaded body to limit loosening and allow tightening of the threaded body. Preferably, the pawl is adapted to interlock with the pump, and its engagement member is biased into engagement with the detents on the threaded body, for example, by elastic, magnetic, or gravitational potential energy. Thus, it will be appreciated that novel pawls, when installed on a pump, allow the threaded body to be tightened, but limit loosening thereof.

Other preferred embodiments of the subject invention include pawls and locks that comprise a number of interlocking members preferably fabricated from elastic metallic wire that may be snapped on to an existing pump.

DESCRIPTION OF ILLUSTRATIVE EMBODIMENTS

The retaining mechanisms of the subject invention are designed primarily to allow easy tightening, but restrict loosening of packing nuts, access bore covers, and other threaded nuts in high pressure, high power pumps that are used in fracturing operations in the oil and gas industry. They may be easily and quickly mounted or otherwise incorporated into pumps of conventional design with little or no modification of the pump.

Figure 1:
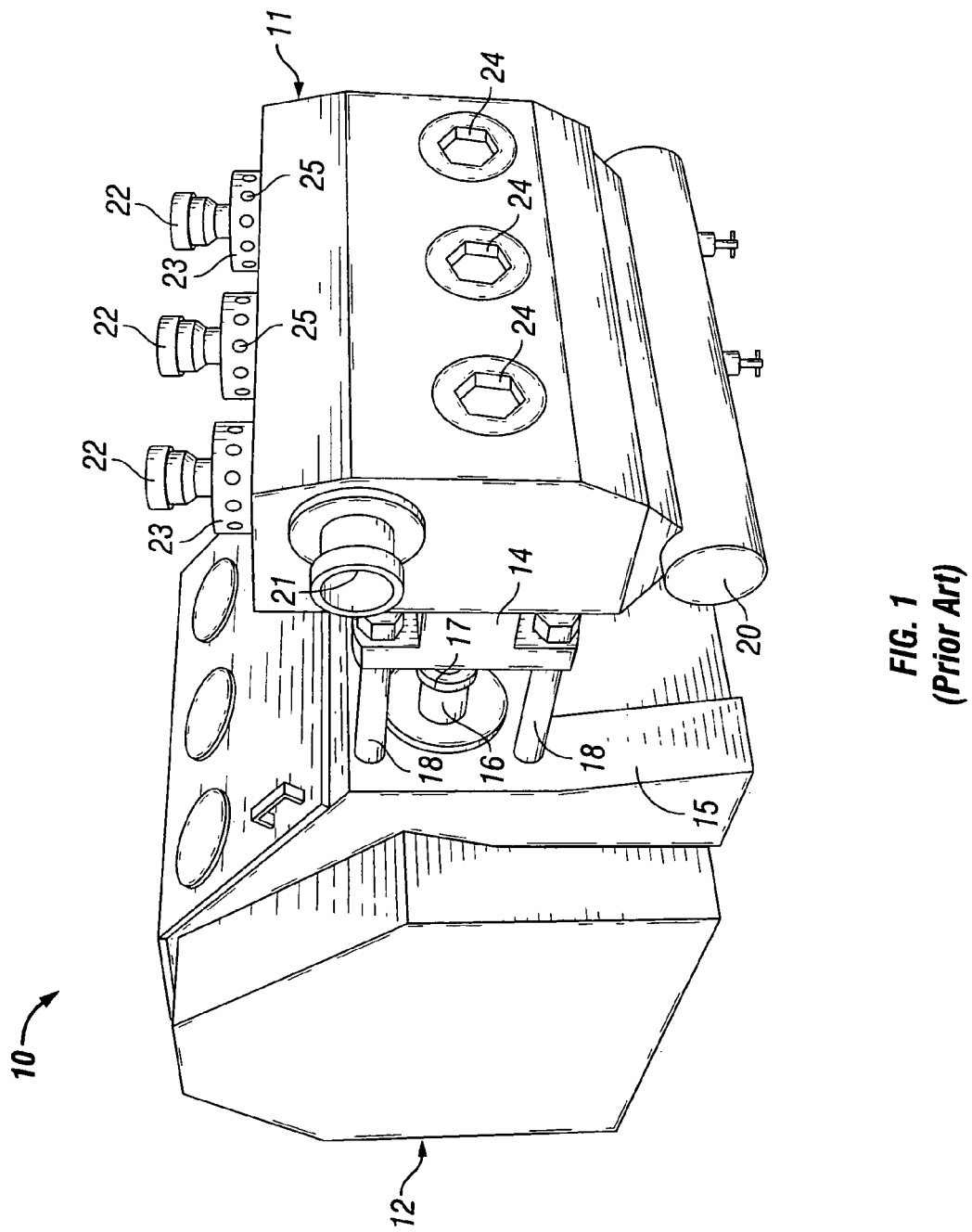
FIG. 1 (prior art) is a perspective view of a prior art frac pump 10 with which the novel threaded body retainers may be used.
Figure 2:
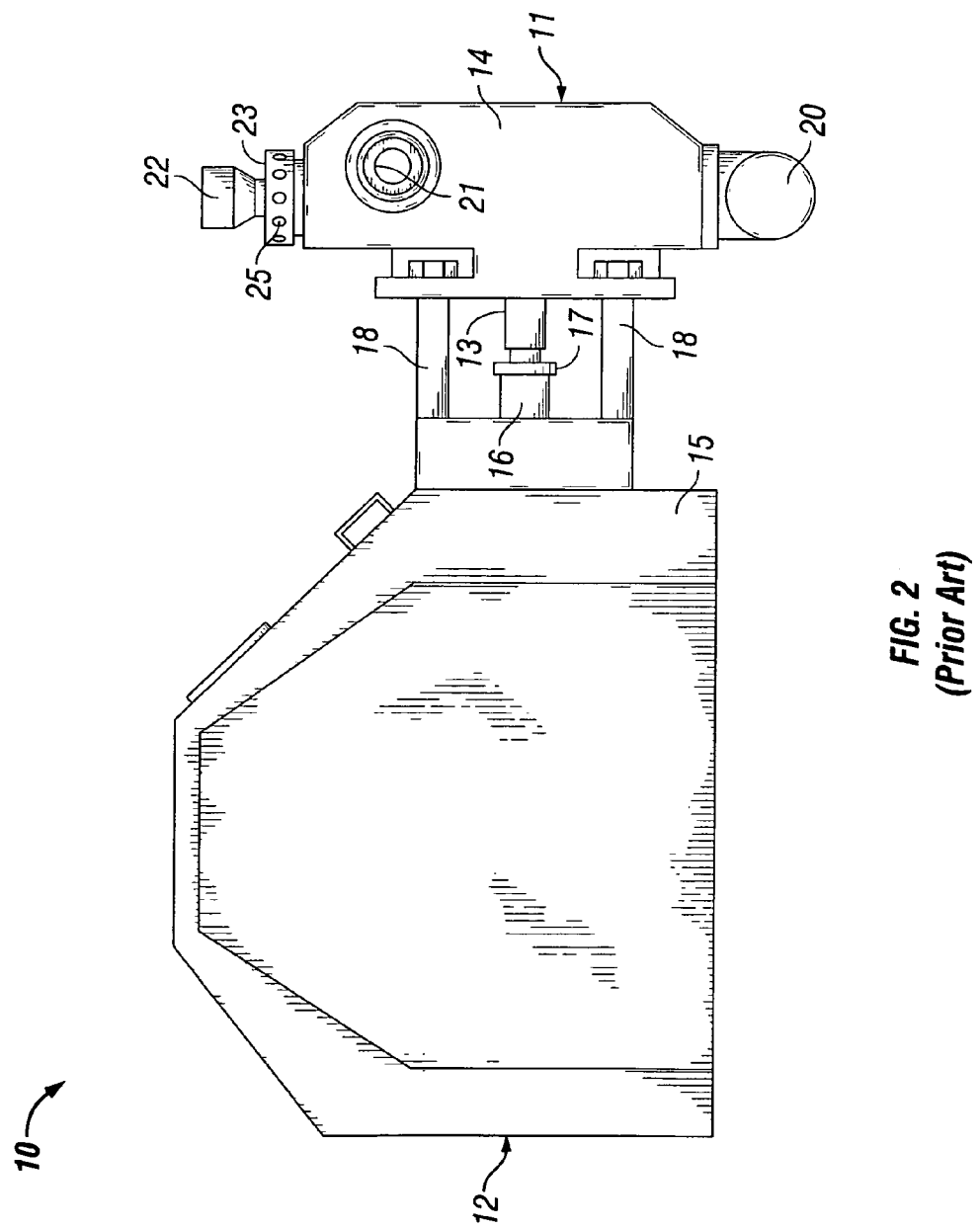
FIG. 2 (prior art) is a side plan view of prior art pump 10 shown in FIG. 1.
Figure 3:
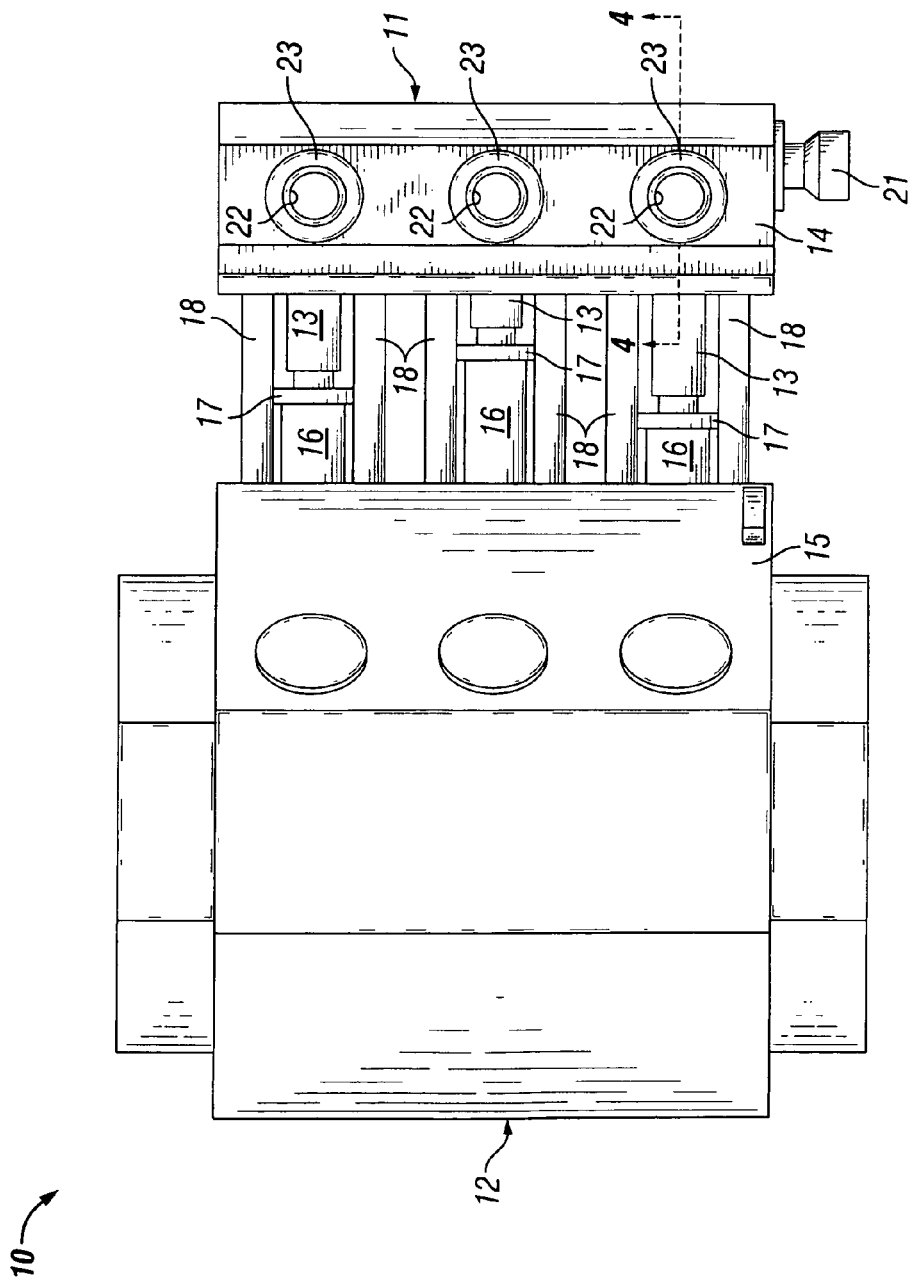
FIG. 3 (prior art) is a top plan view of prior art pump 10 shown in FIGS. 1 and 2.

One such conventional pump is shown generally in FIGS. 1-3. Frac pump 10 is a triplex pump. It has, in essence, three synchronized, manifolded reciprocating pumping units mounted in its so-called "fluid end" 11. The pumping units in fluid end 11 are all powered by a common so-called "power end" 12 and have essentially the same construction which, inter alia, includes reciprocating plungers 13. Plungers 13 are mounted in cylinders (not shown in FIGS. 1-3) defined in a common housing or cylinder block 14. Cylinder block 14, as is typical, is cast and milled from high strength steel as a single component. Alternately, it may be assembled from components or "pods" which are cast and milled separately.

In either event, cylinder block 14 is the major portion of fluid end 11 of pump 10. It not only defines the cylinders in which plungers 13 reciprocate, but also the other chambers and bores in which, and provides a base to which the other fluid end components are mounted directly or indirectly.

Power is supplied to plungers 13 via a crankshaft and other internal mechanisms (not shown) mounted in a housing 15 of power end 12 of pump 10. More specifically, reciprocating motion created by the power end mechanism is transmitted to plungers 13 by pony rods 16 which are connected to plungers 13 via connectors 17. Fluid end 11 and power end 12 also are rigidly and securely connected to each other via a plurality of stay rods 18 which extend between power end housing 15 and cylinder block 14.

Fluid enters fluid end 11 of pump 10 through an inlet 20 and is pumped out through an outlet 21. Pressure or flow gages may be threaded onto stems 22 which are mounted on cylinder block 14 by threaded nuts 23. Access to internal components of fluid end 11 is provided by bores (not shown in FIGS. 1-3) having threaded covers 24.

Figure 4:
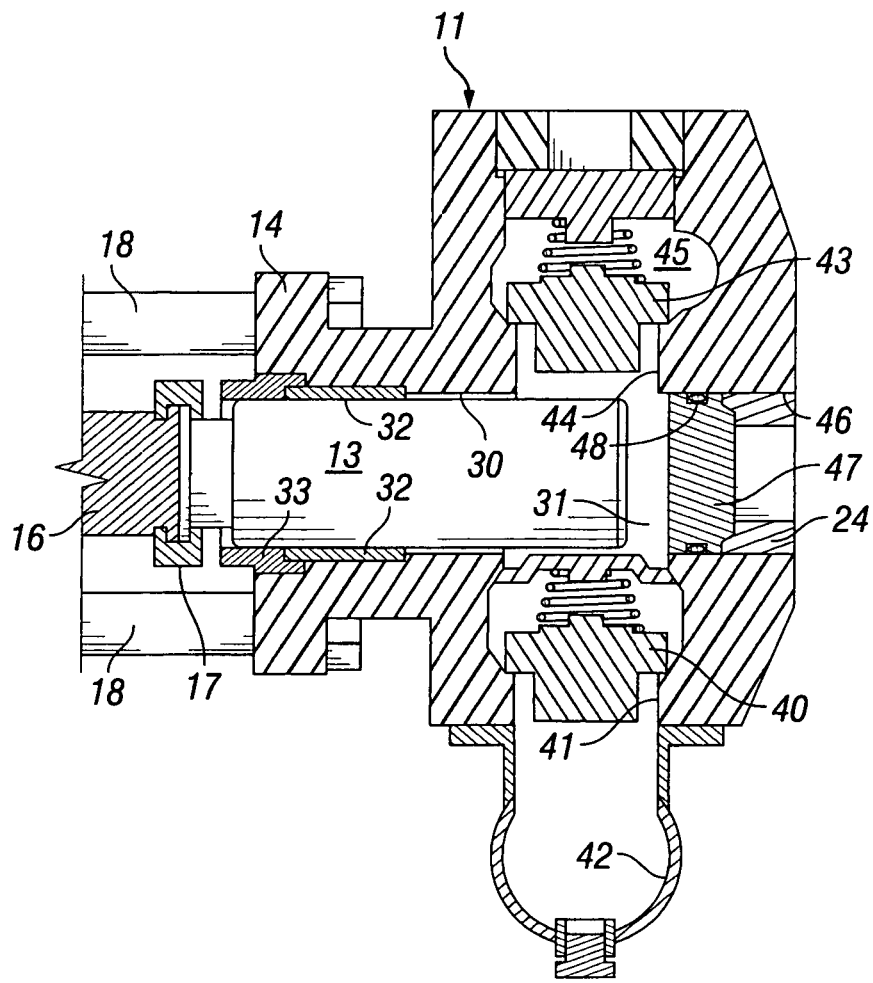
FIG. 4 (prior art) is a cross-sectional view taken generally along line 4-4 of FIG. 3 of prior art pump 10 shown in FIGS. 1-3.

Each plunger 13, as may be seen in FIG. 4, reciprocates in a cylinder 30 defined in cylinder block 14. Plunger 13 is connected at its rear (left) end to pony rod 16 by connector 17. It should be noted that plunger 13 shown in FIG. 4 is at the full extent of its pump stroke, at which point its other, inner (right) end extends into a pump chamber 31. A packing 32 is loaded into a slightly enlarged, rear portion of cylinder 30 to provide a fluid tight seal between cylinder 30 and reciprocating plunger 13.

Packing 32 is held in place by a threaded, annular nut 33 which screws into cylinder block 14. Packing 32 typically incorporates a number of elastomeric, metallic, and/or composite components. Various lubrication channels usually are provided in packing 32, packing nut 33, and/or cylinder block 14 as well. Such features, however, are well known in the art and are not material to illustrating the subject invention. Thus, they are not shown in FIG. 4 for the sake of simplification. Suffice it to say that packing 32 is subject to extreme wear and must be replaced periodically by, inter alia, removing packing nut 33.

Figure 5:
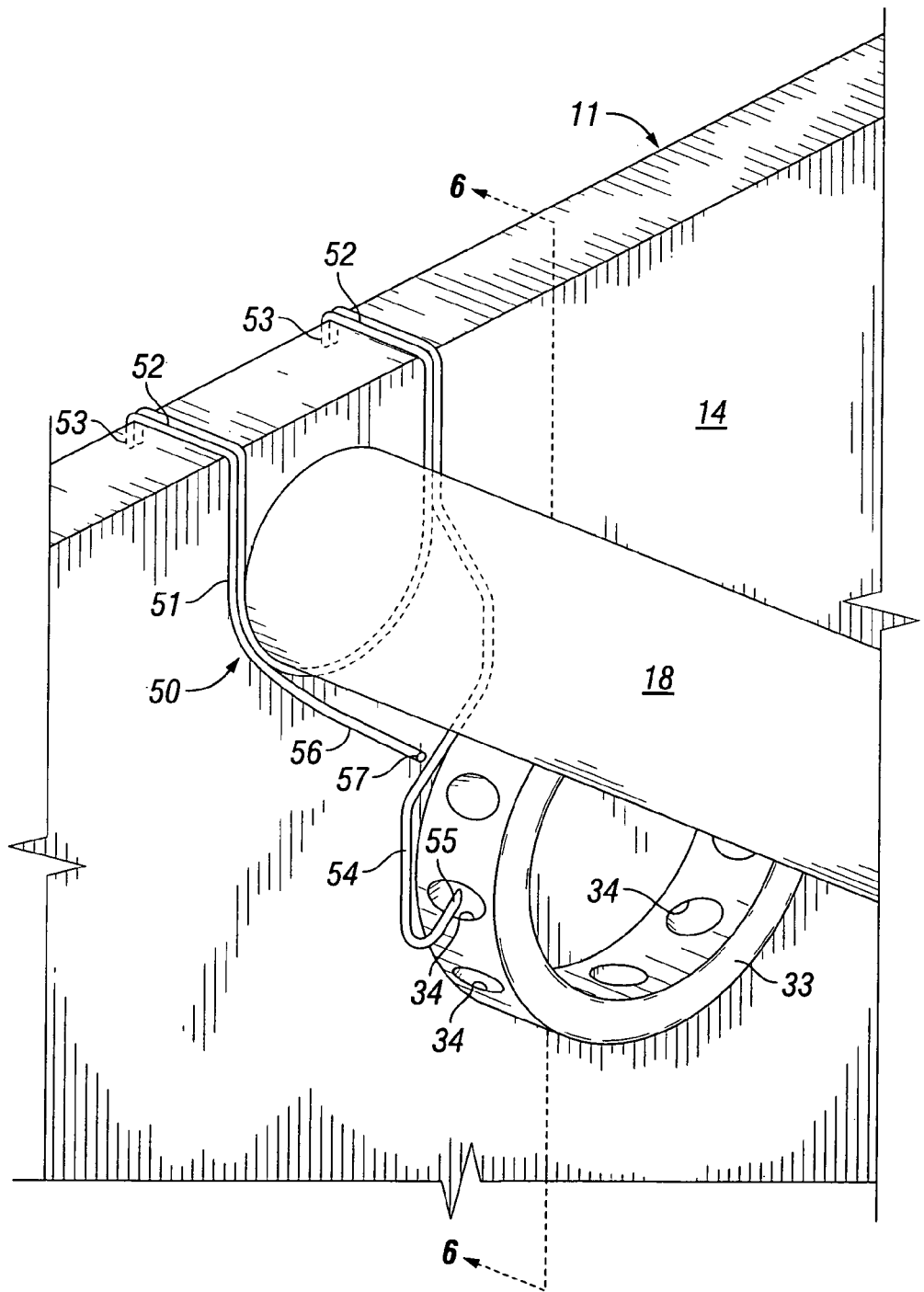
FIG. 5 is a perspective view of a preferred embodiment of the novel retainers, pawl 50, mounted on prior art pump 10 shown in FIGS. 1-4 (certain components omitted for clarity)

Packing nut 33 is of conventional design. The body of packing nut 33 is generally cylindrical, its central aperture allowing plunger 13 to pass therethrough. Its inner end has threads on its outer circumference so that packing nut 33 may be threaded into cylinder block 14. The other, outer end of packing nut 33 is unthreaded, has a generally smooth exterior surface, and extends somewhat beyond the adjacent surface of cylinder block 14. As shown in FIG. 5, packing nut 33 has a series of cylindrical passageways or "spanner holes" 34 passing radially through its outer, exposed, unthreaded end. Spanner holes 34 are configured so that a rod, a so called "spanner" tool (not shown), may be inserted into holes 34 as needed to tighten and loosen nut 33.

Referring again to FIG. 4, pump chamber 31 has a spring-loaded, one-way intake valve 40 mounted in an intake port 41. Intake port 41 is in fluid communication with fluid inlet 20 of pump 10 via a manifolding chamber 42 (as are the intake ports of the other pumping units). A spring-loaded, one-way discharge valve 43 is mounted in a discharge port 44. Discharge port is in fluid communication with fluid outlet 21 of pump 10 via another manifolding chamber 45 (as are the discharge ports of the other pumping units). Thus, fluid is drawn into pump chamber 31 through pump inlet 20, manifolding chamber 42, and intake port 41 as plunger 13 withdraws from pump chamber 31. Fluid then is pumped out of chamber 31, and thence through discharge port, manifolding chamber 45, and pump outlet 21, as plunger 13 enters chamber 31. Given that the fluid flowing through pump 10 typically contains an abrasive proppant, valves 40 and 43 necessarily wear out and must be replaced frequently. Cylinder block 14, therefore, has a bore 46 associated with each pump chamber 31 that allows access to valves 40 and 43.

A cylindrical plug (commonly referred to as a "suction valve cover") 47 and an annular seal 48 are mounted in the inner portion of access bore 46. Together, plug 47 and seal 48 prevent fluid from leaking out of pump chamber 31 through access bore 46. Plug 47 is secured in place by bore cover 24 which is threaded into the outer portion of access bore 46.

Access bore cover 24 too is of conventional design. Its body is generally cylindrical and has a central aperture. The outer circumference of access bore 46 has threads so that bore cover 24 may be threaded into access bore 46. The central aperture has a hexagonal cross-section so that an Allen wrench may be inserted therein to tighten and loosen bore cover 24. Thus, valves 40 and 43 in pump chamber 31 may be replaced as needed by, inter alia, removing threaded bore cover 24.

Since they are of conventional design, the construction of gage stems 22 and their associated components will not be described in any detail. It will be appreciated, however, that stems 22 provide communication with fluid flowing out of the pump chambers 31 so that fluid pressures and flow rates may be monitored. Stems 22 and their associated sealing elements (not shown) are held in place by stem nuts 23. Stem nuts 23 are similar to packing nuts 33 in that they are generally cylindrical with their central aperture allowing gage stem 22 to pass therethrough. One end is threaded so that stem nut 23 may be threaded into cylinder block 14. The other end of stem nut 23 is unthreaded, has a generally smooth exterior surface, and extends somewhat beyond the surface of cylinder block 14. Like packing nut 33, stem nut 23 is provided with a series of spanner holes 25 so that nut 23 may be tightened and loosened.

It will be appreciated that when they are properly tightened, packing nuts 33, access bore covers 24, and gage stem nuts 23 ensure that pump 10 operates in a fluid tight fashion. They have relatively large diameters, however, and thus, their threads are required to absorb proportionally more vibrational energy than a threaded body of lesser diameter. As pump 10 is operated, and especially as it is operated at high power for extended periods of time, vibration and reciprocating forces from plunger 13 may cause those threaded bodies to loosen or back out. Some loosening may be tolerated, but as they loosen, they back out and may allow leakage around the various sealing elements.

For example, as packing nut 33 backs out, packing 32 may become distorted and allow fluid to leak out around plunger 13. More dramatically, as will be appreciated from FIG. 4, the clearance between packing nut 33 and connector 17 is relatively small. If packing nut 33 loosens to the extent that it is impacted by connector 17 as pony rod 16 reciprocates, pump 10 can be severely damaged. Likewise, if bore covers 24 loosen entirely, they may be propelled from pump 10 and inflict damage to other equipment or injure operators.

Thus, the retaining mechanisms of the subject invention are designed primarily to allow easy tightening, but restrict loosing of packing nuts, access bore covers, stem nuts, and other threaded bodies. They have particular utility is respect to relatively large bodies threaded into reciprocating pumps and, in particular, the fluid end cylinder block of such pumps. In accordance therewith, the novel retaining mechanisms include novel retainers that are mounted to a pump. Preferably, the retainer has one or more elastic members that are able to flex and allow the retainer to be interlocked with a pump.

Figure 6:
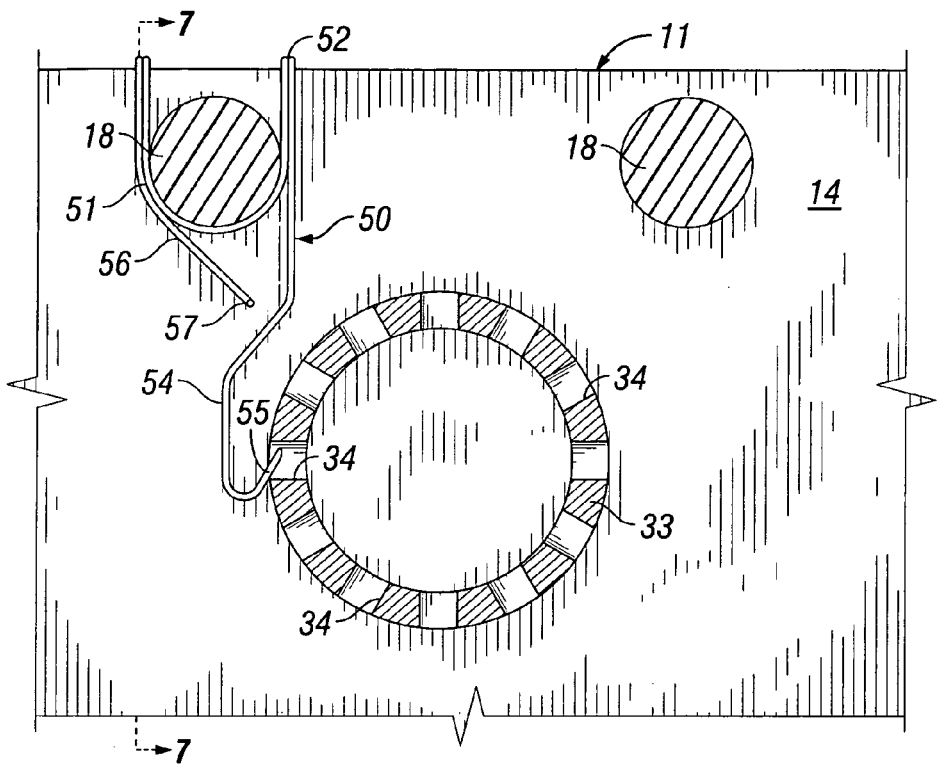
FIG. 6 is a cross-sectional view of preferred pawl 50 shown in FIG. 5 mounted on prior art pump 10 taken along line 6-6 of FIG. 7.
Figure 7:
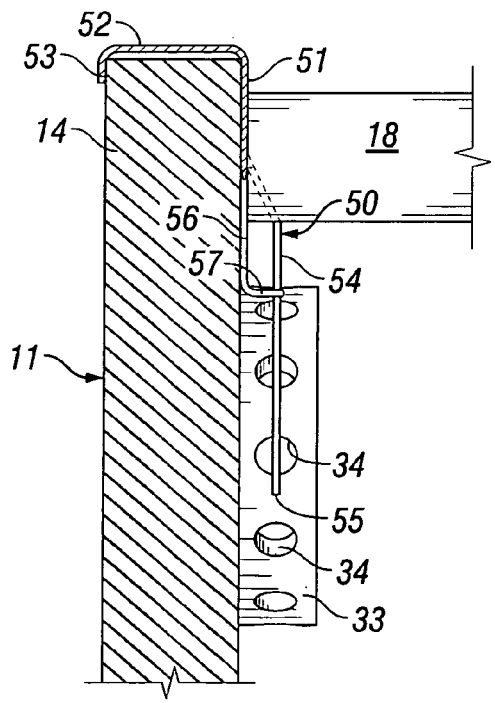
FIG. 7 is a cross-sectional view of preferred pawl 50 shown in FIGS. 5 and 6 mounted on prior art pump 10 taken along line 7-7 of FIG. 5.

For example, a preferred embodiment of the novel retainers, pawl 50, is shown in FIGS. 5-7 as it may be mounted on cylinder block 14 of prior art pump 10. It will be noted that plunger 13 and various other components of pump 10 are omitted from FIGS. 5-7 for the sake of clarity.

Pawl 50 has a body member 51. Body 51 lies vertically along the surface of cylinder block 14, as seen best in FIGS. 5 and 7, and abuts stay rod 18 which is mounted to and extends from the surface of cylinder block 14. Leg members 52 extend from body 51. Legs 52 extend horizontally beyond the edge of cylinder block 14 and abut the top side thereof. A foot member 53, seen best in FIG. 7, extends downward from each leg 52 and abuts the opposite vertical side of cylinder block 14. Finally, arm member 54 extends from pawl body 51 into engagement with, as described in further detail below, spanner holes 34 in packing nut 33. (It should be noted that references to horizontal, downward, and the like are made from the perspective shown in FIG. 7, which is the general orientation in which pump 10 typically will be operated.)

It will be appreciated that its configuration allows pawl 50 to interlock with pump 10. That is, pawl 50 comprises members 51, 52, and 53 that abut various surfaces and features of pump 10 so that it may be mounted on pump 10 without the necessity for fasteners such as welds, screws, bolts, clamps, or other fasteners securing it to pump 10. More particularly, translation or rotation of pawl body 51 on the vertical surface of cylinder block 14 is minimized by its abutment with stay rod 18 and abutment of legs 52 with the top of cylinder block 14. Movement of pawl body 51 away from the surface of cylinder block 14 is minimized by abutment of feet with the opposite side of cylinder block 14.

Interlocking retainers may be assembled from multiple components that are mounted by assembling the components on a pump. For example, a retainer similar to pawl 50 could be provided with a cast or milled metallic body having detachable legs secured by screws or other fasteners. The retainer then could be interlocked to a pump by locating the body on a pump and then attaching the legs. Preferably, however, the novel retainers are an integral component. That is, regardless of whether it is assembled from multiple components, the retainer is installed as a unit without any disassembly thereof. The novel retainers, therefore, preferably incorporate one or more elastic members that are adapted to flex during installation and allow the retainer to be interlocked with a pump.

For example, pawl 50 is fabricated from various welded lengths of elastic steel wire. The elasticity of the steel wire from which it is fabricated allows pawl 50 to be flexed and distorted sufficiently so that it can be interlocked onto cylinder block 14. Other elastic metallic wires and materials, however, may be used. Likewise, it is not necessary that the entire configuration of the preferred retainers be elastic. Portions, such as the body, may be relatively rigid, so long as other members, such as its legs, are sufficiently elastic.

Pawl 50, therefore, has an important advantage in that it may be installed on pump 10 quickly and easily more or less by snapping it into place. No assembly of pawl 50 is required. No modification or disassembly of pump 10 is required. Moreover, while it has been illustrated as mounted to pump 10, pawl 50 and other novel retainers may be easily adapted to take advantage of whatever surface features may be present on pumps having different designs. Thus, they may be installed on a wide variety of prior art pumps already in service. At the same time, however, other embodiments of the novel retainers may be mounted to pump 10 or other prior art pumps by any suitable means, such as by welds, screws, bolts, clamps, or other fasteners.

The novel retainers further include a member which is adapted to engage a threaded body in the cylinder block of the pump's fluid end. The engaging member acts to limit loosening of the threaded body. Preferred embodiments of the subject invention include pawls and ratchet mechanisms having an engaging member which engages detents in the threaded body in the cylinder block of the pump. Thus, the threaded body may be tightened, but loosening of the threaded body is limited.

For example, arm 54 of pawl 50 engages packing nut 33. More specifically, as may be seen best in FIGS. 5 and 6, the end portion of arm 54 is angled backward along the general extension of arm 54 and forms a finger 55. The end of finger 55 is truncated at an angle generally tangential to the outer surface of packing nut 33. It will be appreciated that pawl 50 is fabricated such that when installed on pump 10 arm 54 acts as a spring arm. That is, arm 54 is flexed sufficiently so that it is elastically biased and, in turn, urges finger 55 against packing nut 33.

Packing nut 33 is illustrated in FIGS. 5-7 in a torqued state, that is, it has been tightened to whatever specifications may be called for with the expectation, or at least hope, that packing nut 33 will remain tight and secure. As noted, however, as pump 10 is operated, especially at high power over extended periods of time, packing nut 33 can begin to loosen. Thus, pawl 50 operates to limit that loosening so that the seal provided by packing 32 is not compromised and damage to pump 10 is avoided.

That is, and referring to FIG. 5, it will be noted that finger 55 of pawl 50 has engaged a spanner hole 34 in packing nut 33. That engagement between finger 55 and spanner hole 34 enables pawl 50 to limit any loosening of packing nut 34. It will be appreciated, however, that packing nut 34 may be installed and tightened without regard to the alignment of spanner holes 34. If finger 55 is not aligned with a spanner hole 34 after packing nut is tightened, arm 54 will bias finger 55 against the generally smooth exterior surface of packing nut 33 that extends somewhat beyond the surface of cylinder block 14. As packing nut 33 loosens, it will rotate counterclockwise, sliding under finger 55. Eventually, as packing nut 33 continues to loosen, finger 55, being elastically energized, will drop into the first advancing spanner hole 34. At that point the engagement between finger 55 and spanner hole 34 enables pawl 50 to prevent further loosening of packing nut 33.

The novel pawls, however, also allow for tightening of threaded bodies when they are installed. For example, packing nut 33 may be further tightened, if necessary, even after pawl 50 is installed and even if finger 55 is engaging a spanner hole 34. As best appreciated from FIGS. 5 and 6, as packing nut 33 is tightened, i.e., rotated in a clockwise direction, the advancing edge of spanner hole 34 will engage the angled length of finger 55. That angled length acts as a ramp and moves finger 55 out of spanner hole 34 and back onto the smooth outer surface of packing nut 33.

Preferably, the engaging member in the novel retainers is translatable from a first, engaged position and a second, disengaged position. The novel retainers also preferably include means for holding or otherwise preventing the engaging member from engaging the threaded body so that the threaded body may be more easily removed and installed into its borehole. Thus, for example, pawl 50 has a second, latch arm 56 extending from body 51. The end 57 of latch arm 56 is bent upwards as seen, best in FIG. 7. Thus, pawl arm 54 may be flexed back and latched over latch arm 56 where it will be held free and clear of packing nut 33. When arm 54 is latched, packing nut 33 may be more easily installed and removed.

It will be appreciated that in the exemplified preferred embodiment packing nut 33 is allowed to rotate counterclockwise, i.e., loosen a maximum of approximately 30°, to there being 12 spanner holes 34 in packing nut 33. Given the typical pitch of the threads on packing nuts, that limited rotation will not back out packing nut 33 to a degree sufficient to permit damage to or distortion of packing 32 or impairment of the seal it provides between plunger 13 and cylinder 30. Importantly, packing nut 33 is prevented from backing out of cylinder 30 to the extent where it might be impacted by connector 17 as pump 10 is operated. At the same time, however, it will be appreciated that loosening of packing nut 33 may be limited to a greater or lesser extent by varying the number of spanner holes 34 or thread pitch in packing nut 33.

It also will be appreciated that spanner holes 34, given that they typically are provided in conventional packing nuts and other pump threaded bodies, easily serve as detents. Thus, an effective retaining mechanism may be provided simply by installing a novel pawl. Other profiles may be provided in exposed surfaces of threaded bodies, however, and the engaging member of the novel pawls may be otherwise configured, to create a pawl-detent engagement. For example, a pump may be provided with a packing nut which has a series of undercut grooves or notches, or a series of angled teeth spaced along a portion of its exposed, outer circumference. The engaging member of the pawl may be suitably configured so that it will slip in and out of such profiles when packing nut is tightened, but will eventually engage a profile if packing nut loosens and limit any further loosening.

Thus, it will be understood that in this preferred aspect, the invention is not limited to the precise configuration of pawl engaging member or packing nut detents, or to the manner in which a ratchet engagement is accomplished. The novel retaining mechanisms encompass a variety of pawls capable of engaging a detent when the nut is loosened, but not when tightened and, conversely, a variety of detents capable of engaging a pawl when the nut is loosened, but not when tightened.

By providing a ratchet engagement, a packing nut or other threaded body may be tightened to whatever torque is desired without concern for whether the engaging member on a novel pawl will engage a detent when the pawl is installed. Likewise, further tightening of the threaded body is permitted even if the pawl is installed, as the engaging member will be urged out of engagement with the spanner holes or other detents as the threaded body is tightened. Thus, providing a ratchet engagement between the engaging member and threaded body is preferred.

Figure 8:
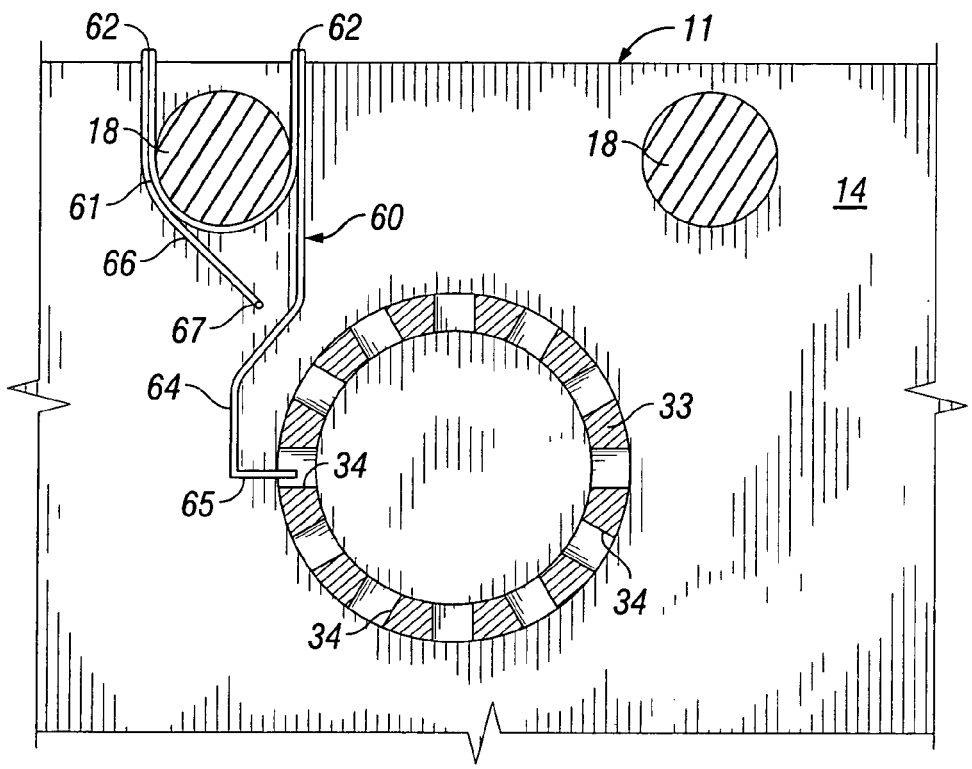
FIG. 8 is a cross-sectional view similar to the view of FIG. 6 showing a preferred lock 60 mounted on prior art pump 10.

At the same time, the novel retainers also include locks. That is, other preferred embodiments of the novel retainers include an engaging member that engages a threaded body and limits rotation of the threaded body in either direction. For example, lock 60 shown in FIG. 8 has the same general configuration as pawl 50 and may be mounted to pump 10 in the same manner as described above. Lock 60, however, has a finger 65 which extends more or less at a right angle from an arm 64. Thus, when packing nut 33 is tightened, or becomes loosened to the point where a spanner hole 34 aligns with finger 65, finger 65 will move into the spanner hole 34 as shown in FIG. 8. Finger 65 is substantially unramped in either direction, so it will not be urged out of engagement with spanner hole 34 and rotation of packing nut 33 will be limited in both directions. Of course, other profiles or catches may be provided, respectively, in a threaded body and the engaging member such that the novel locks engage and limit rotation of a threaded body in both directions.

Figure 9:
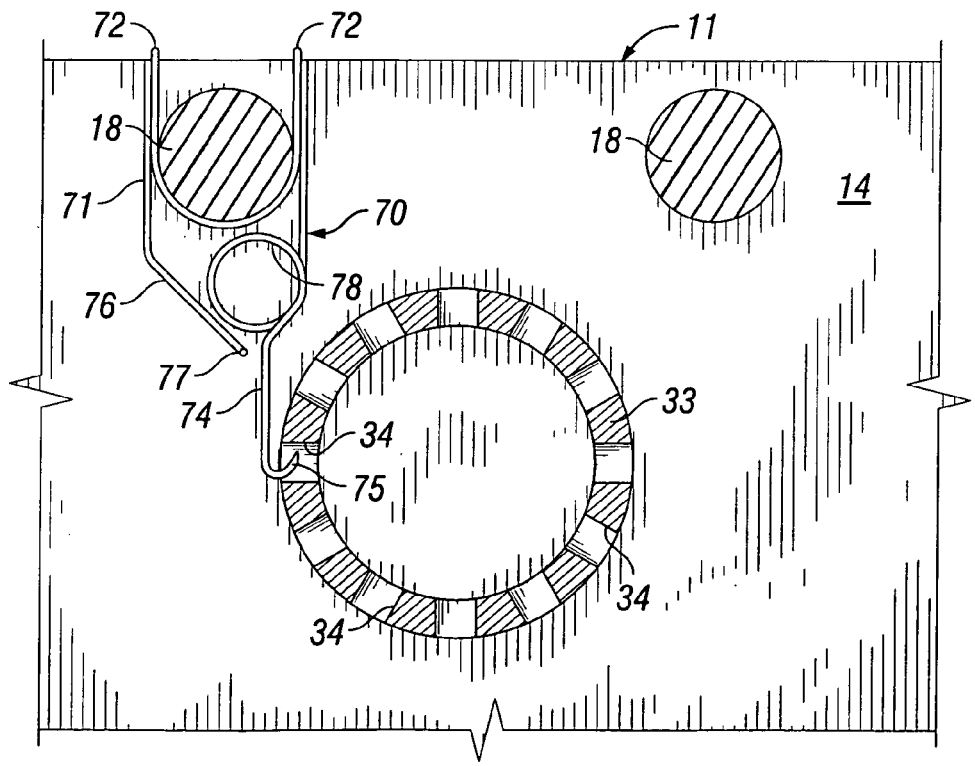
FIG. 9 is a cross-sectional view similar to the view of FIG. 6 showing a second preferred pawl 70 mounted on prior art pump 10.

It also will be appreciated that an elastic arm, such as arms 54 and 64 in pawl 50 and lock 60, provides reliable, cost effective elastic means for urging an engaging member into engagement with a threaded body. Other elastic members, such as coiled springs in torsion or tension, may be devised and used if desired. For example, pawl 70 shown in FIG. 9 is provided with a torsion spring. Pawl has the same general configuration as pawl 50 and may be mounted to pump 10 in the same manner as described above. Arm 74, however, incorporates a coil spring 78. When pawl is mounted on pump 10 coil spring 78 is under rotational torsion such that finger 75 is urged into engagement with packing nut 33 and will actuate movement of finger 75 into spanner hole 34 as packing nut 33 loosens.

Likewise, the novel retainers may have other means which, by virtue of their position, structure, or composition, store potential energy and are capable of moving the engaging member into a position where it limits loosening of a threaded body. For example, since packing nuts and other threaded bodies typically are made of ferromagnetic alloys, engaging member of the novel retainers could be provided with magnetic potential energy by fabricating one or more components from permanently or temporarily magnetized ferromagnetic materials. Arm and/or finger of pawl, for example, could be fabricated of magnetized ferromagnetic materials. Arm then could be configured and fabricated such that there is little or no flex biasing arm toward packing nut, or such that finger is normally spaced from packing nut. Finger then could be positioned so that it is biased into and remains in engagement with packing nut.

Figure 10:
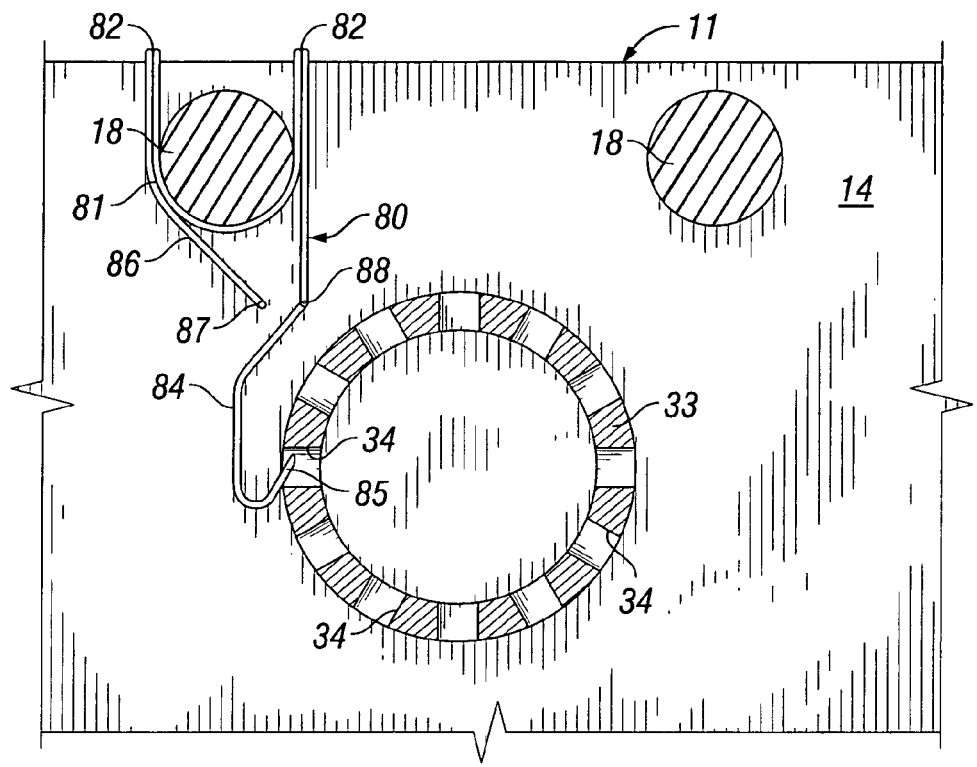
FIG. 10 is a cross-sectional view similar to the view of FIG. 6 showing a third preferred pawl 80 mounted on prior art pump 10.

Another approach utilizing magnetic potential energy is exemplified by pawl 80 shown in FIG. 10. Pawl has the same general configuration as pawl 50 and may be mounted to pump 10 in the same manner as described above. Arm 84 of pawl, however, includes segments 84*a* and 84*b* joined by a hinge connection 88. Thus, magnetized finger 85 is able to move into, and is biased toward engagement with packing nut 33. The novel retainers also could be mounted to a pump in a hinged fashion, for example via a penannular body member that snaps around a stay rod and allows the body member to rotate as an engaging member is influenced to engage a threaded body by a magnetic field.

Figure 11:
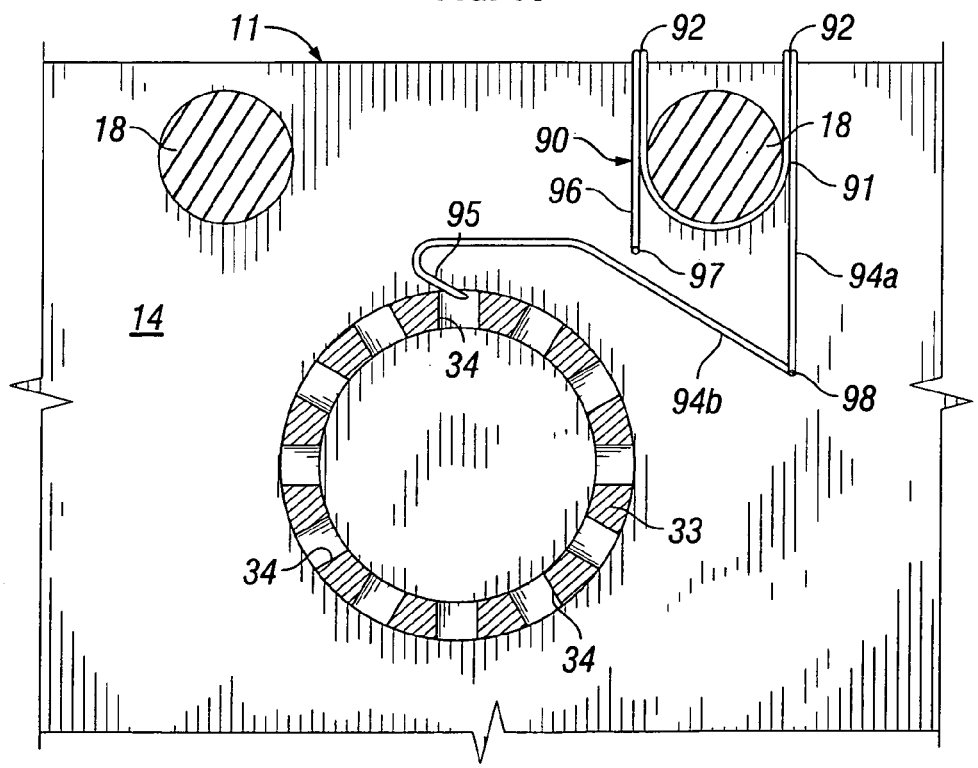
FIG. 11 is a cross-sectional view similar to the view of FIG. 6 showing a fourth preferred pawl 90 mounted on prior art pump 10.

Similarly, the novel retainers may be constructed such that the engaging member has gravitational potential energy and is allowed to drop into a position where it limits loosening of a threaded body. For example, as shown in FIG. 11, a pawl 90 could be provided with a hinged arm 94 wherein arm segments 94*a* and 94*b* are joined by hinge connection 98. Pawl 90 has the same general configuration as pawl 50 and may be mounted to pump 10 in the same manner as described above. It will be appreciated, however, that arm section 94*b* extends more or less horizontally over packing nut 33 so that a finger 95 is allowed to drop into spanner holes on packing nut 33.

It will be readily apparent that, though illustrated as applied to packing nuts, the novel retainers may be used to advantage with other threaded closures commonly utilized in reciprocating pumps. For example, they may be used to limit loosening of stem nuts a used to mount gage stems. Since they typically include spanner holes, as do packing nuts, the exemplified retainers may be used with little or no modification except as may be required to mount the retainer to a pump. Preferably, the novel retainers are provided with interlocking members, including elastic interlocking members, so that they may be interlocked to a pump. Alternately, novel pawls may simply be mounted to a pump by welds, bolts, or other fasteners.

Figure 12:
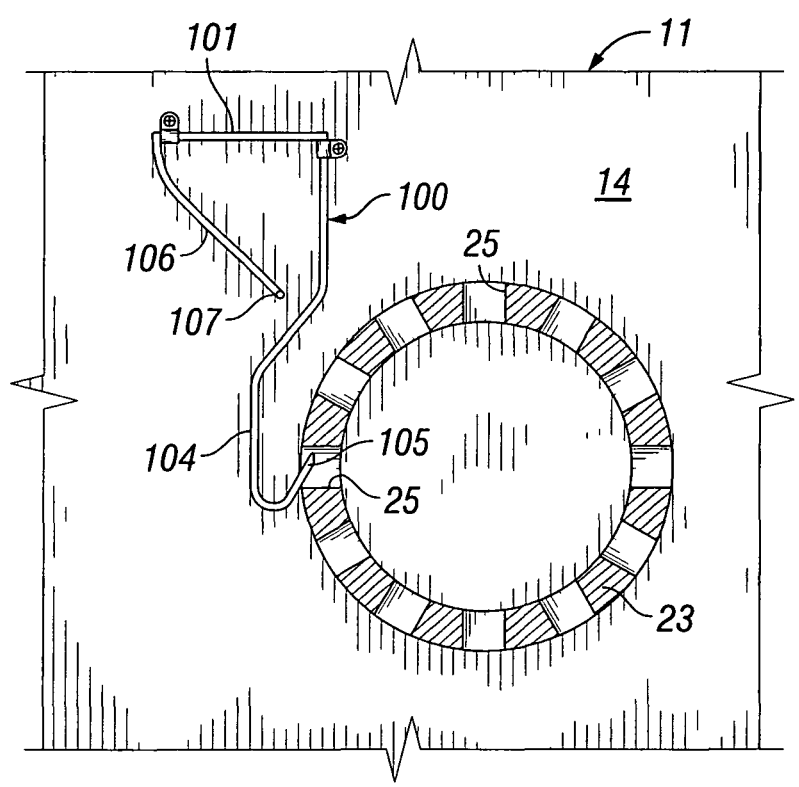
FIG. 12 is a cross-sectional view similar to the view of FIG. 6 showing a fifth preferred pawl 100 mounted on prior art pump 10.

For example, pawl 100 shown in FIG. 12, is designed to be fastened to cylinder block 14 by threaded fasteners. Pawl is fabricated from a length of elastic steel wire. A body member 101 is secured to cylinder block 14 in the vicinity of a stem nut 23 by screw fasteners 108. In other respects, it is similar to pawl 50 described above. An elastic arm 104 extends from one end of body 101. When installed, arm 104 is flexed slightly such that a finger 105 at the end of arm 104 is biased toward stem nut 23 (gage stem being omitted from FIG. 12 for the sake of clarity). Finger 105 is adapted to engage spanner holes 25 in stem nut 23. Arm 104 may be latched over a latch arm 106 which extends from the other end of body 101, so that finger 105 is held out of engagement with stem nut 23.

The novel retainers also may be used to limit loosening of access bore covers. Suitable profiles may be provided in covers 24, and the novel retainers may be provided with cooperating engaging members in a number of ways readily apparent to workers in the art. For example, covers 24 may be lengthened such that, when fully torqued, they extend somewhat beyond the surface of cylinder block 14 and present an exposed surface on which detent or catch profiles may be provided. Also, instead of having recesses for Allen wrenches, covers 24 may be provided with have spanner holes. Pawl 100, for example, then may be mounted to pump 10 adjacent cover such that its finger 105 engages and limits loosening of the cover.

The invention has been illustrated as mounted to a prior art pump 10 which has a specific, albeit common design. It will be appreciated, however, that the novel retainers may be used in pumps having different designs. Likewise, the novel retainers and retaining mechanisms have been described in the context of high pressure, high power reciprocating pump of the type used for fracturing operations primarily because there is a significant likelihood that the relatively large-diameter threaded bodies incorporated therein will loosen. The subject invention, however, is not limited in its application to such pumps. It may be used to advantage in other types of reciprocating pumps where loosening of threaded bodies is a potential issue.

While this invention has been disclosed and discussed primarily in terms of specific embodiments thereof, it is not intended to be limited thereto. Other modifications and embodiments will be apparent to the worker in the art.

What is claimed is:

1. A retainer, said retainer comprising:
   (a) one or more elastic members adapted to flex and allow said retainer to be interlocked with a reciprocating pump used for pumping fluid into a well; and
   (b) a threaded body engaging member adapted to engage a body threaded into a fluid end cylinder block of said reciprocating pump and to limit loosening and allow tightening of said threaded body while said threaded body engaging member remains engaged with said threaded body.

2. The retainer of claim 1, wherein said threaded body engaging member, when said retainer is mounted to said pump, is biased into engagement with said threaded body.

3. The retainer of claim 2, wherein said threaded body engaging member is spring loaded and, when said retainer is mounted to said pump, is elastically biased against said threaded body.

4. The retainer of claim 3, wherein said threaded body engaging member is biased against said threaded body by an elastic arm.

5. The retainer of claim 2, wherein said threaded body is composed of a ferromagnetic material, said threaded body engaging member is composed of a magnetized ferromagnetic material, and said threaded body engaging member, when said retainer is mounted to said pump, is magnetically biased against said threaded body.

6. The retainer of claim 2, wherein said threaded body engaging member, when said retainer is mounted to said pump, is gravitationally biased against said threaded body.

7. The retainer of claim 1, wherein said retainer is a pawl and said threaded body engaging member is adapted to engage one or more of a plurality of detents on said threaded body and, thereby, to limit loosening and allow tightening of said threaded body.

8. The retainer of claim 1, wherein said threaded body is a packing nut, gage stem nut, or an access bore cover.

9. The retainer of claim 1, wherein said threaded body comprises a plurality of spanner openings and said threaded body engaging member limits loosening of said threaded body by engaging at least one of said spanner openings.

10. A retainer for a body threaded into a fluid end cylinder block of a reciprocating pump having a fluid end connected to a power end by a plurality of stay rods; said retainer comprising:
    (a) a body member adapted to abut at least one said stay rod extending from a first surface of said fluid end cylinder block;
    (b) a leg member extending from said body member adapted to extend beyond said fluid end cylinder block and to abut a cylinder block surface adjoining said first surface;
    (c) a foot member extending from said leg member adapted to abut a cylinder block surface opposite to said first surface; and
    (d) an arm member extending from said body member;
    (e) a finger member adapted to engage a threaded body threaded into a bore in said fluid end cylinder block and to limit loosening of said threaded body in said bore; wherein
    (f) one or more of said members are elastic and allow said retainer to flex and interlock with said pump.

11. The retainer of claim 10, wherein said body member defines a generally u-shaped profile adapted to partially encircle said stay rod and has a pair of leg members extending from the open end of said u-shaped body member.

12. The retainer of claim 10, wherein said retainer is fabricated from metallic wire.

13. The retainer of claim 10, wherein said arm member is elastic and, when said retainer is mounted to said pump, said finger member is elastically biased against said threaded body.

14. The retainer of claim 10, wherein said retainer is a stop and said finger member is adapted to engage said threaded body and to limit loosening and tightening of said threaded body.

15. The retainer of claim 10, wherein said retainer is a pawl and said finger member is adapted to engage one or more of a plurality of detents on said threaded body and, thereby, to limit loosening and allow tightening of said threaded body.

16. The retainer of claim 10, wherein said threaded body comprises a plurality of spanner openings and said retainer limits loosening of said threaded body by said finger member engaging at least one of said spanner openings.

17. The retainer of claim 10, wherein said retainer further comprises a second arm member extending from said body member and adapted to engage said first arm and prevent said finger member from engaging said threaded body.

18. A reciprocating pump comprising a body threaded into a fluid end cylinder block of said pump and the retainer of claim 10.

19. The pump of claim 18, wherein said threaded body is a packing nut, gage stem nut, or an access bore cover.

20. The pump of claim 18, wherein said threaded body comprises a plurality of spanner openings and said finger member limits loosening of said threaded body by engaging at least one of said spanner openings.

21. A ratchet apparatus for retaining a threaded body in engagement with a threaded bore in a housing of a reciprocating pump, the apparatus comprising:
 (a) a pawl mounted on said pump housing and comprising an engaging member;
 (b) a plurality of detents provided in said threaded body;
 (c) said pawl engaging member translatable from a first, engaged position and a second, disengaged position;
 (d) said engaging member in said engaged position being translatable in and out of said detents in said threaded body as said threaded body is tightened and engaging one or more of said detents in said threaded body as said threaded body is loosed, said pawl in said engaged position thereby allowing said threaded body to be tightened but minimizing loosening of said threaded body; and
 (e) said engaging member in said disengaged position being clear of said detents, thereby allowing said threaded body to be loosened and removed from said threaded bore.

22. The ratchet apparatus of claim 21, wherein said detents in said retaining nut are a series of spanner holes.

23. The ratchet apparatus of claim 21, wherein said detents in said retaining nut are a series of grooves.

24. A pawl comprising a detent engaging member adapted to engage one or more detents in a threaded body threaded into a fluid end cylinder block of a reciprocating pump used for pumping fluid into a well and, thereby, to limit loosening and allow tightening of said threaded body while said detent engaging member remains engaged with said threaded body.

25. The pawl of claim 24, wherein said pawl comprises one or more interlocking members adapted to interlock said pawl to said pump.

26. The pawl of claim 25, wherein said interlocking members comprise an elastic interlocking member.

27. The pawl of claim 24, wherein said detent engaging member, when said pawl is mounted to said pump, is biased into engagement with said detents.

28. The pawl of claim 24, wherein said threaded body is a packing nut, gage stem nut, or an access bore cover.

29. The pawl of claim 24, wherein said threaded body comprises a plurality of spanner openings providing said detents, said pawl being adapted to engage said spanner openings.

30. A reciprocating pump comprising a body threaded into a fluid end cylinder block of said pump and the pawl of claim 24.

31. A reciprocating pump comprising a body threaded into a fluid end cylinder block of said pump and the pawl of claim 25.

32. A reciprocating pump comprising a body threaded into a fluid end cylinder block of said pump and the pawl of claim 26.

33. A reciprocating pump comprising a body threaded into a fluid end cylinder block of said pump and the pawl of claim 27.

34. A reciprocating pump comprising a body threaded into a fluid end cylinder block of said pump and the pawl of claim 28.

35. A reciprocating pump comprising a body threaded into a fluid end cylinder block of said pump and the pawl of claim 29.

36. A reciprocating pump comprising a body threaded into a fluid end cylinder block of said pump and a retainer, said retainer comprising:
 (a) one or more elastic members adapted to flex and allow said retainer to be interlocked with said reciprocating pump; and
 (b) a threaded body engaging member adapted to engage said threaded body and to limit loosening of said threaded body.

37. The pump of claim 36, wherein said threaded body engaging member, when said retainer is mounted to said pump, is biased into engagement with said threaded body.

38. The pump of claim 37, wherein said threaded body engaging member is spring loaded and, when said retainer is mounted to said pump, is elastically biased against said threaded body.

39. The pump of claim 38, wherein said threaded body engaging member is biased against said threaded body by an elastic arm.

40. The pump of claim 37, wherein said threaded body is composed of a ferromagnetic material, said threaded body engaging member is composed of a magnetized ferromagnetic material, and said threaded body engaging member, when said retainer is mounted to said pump, is magnetically biased against said threaded body.

41. The pump of claim 37, wherein said threaded body engaging member, when said retainer is mounted to said pump, is gravitationally biased against said threaded body.

42. The pump of claim 36, wherein said retainer is a stop and said threaded body engaging member is adapted to engage said threaded body and to limit loosening and tightening of said threaded body.

43. The pump of claim 36, wherein said retainer is a pawl and said threaded body engaging member is adapted to engage one or more of a plurality of detents on said threaded body and, thereby, to limit loosening and allow tightening of said threaded body.

44. The pump of claim 43, wherein said threaded body engaging member is adapted to limit loosening and allow tightening of said threaded body while said threaded body engaging member remains engaged with said threaded body.

45. The pump of claim 43, wherein said threaded body is a packing nut, gage stem nut, or an access bore cover.

46. The pump of claim 44, wherein said threaded body is a packing a nut, gage stem nut, or an access bore cover.

47. The pump of claim 36, wherein said threaded body is a packing nut, gage stem nut, or an access bore cover.

48. The pump of claim 36, wherein said threaded body comprises a plurality of spanner openings and said threaded body engaging member limits loosening of said threaded body by engaging at least one of said spanner openings.

* * * * *